US012730661B2

United States Patent
Eberlein et al.

(10) Patent No.: US 12,730,661 B2
(45) Date of Patent: Sep. 8, 2026

(54) SECURE SIDECAR CONTAINER

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 556 days.

(21) Appl. No.: 18/191,343

(22) Filed: Mar. 28, 2023

(65) Prior Publication Data

US 2024/0330031 A1 Oct. 3, 2024

(51) Int. Cl.
*G06F 9/455* (2018.01)
*G06F 8/61* (2018.01)
*G06F 9/54* (2006.01)

(52) U.S. Cl.
CPC ............ *G06F 9/45558* (2013.01); *G06F 8/63* (2013.01); *G06F 9/547* (2013.01); *G06F 2009/45595* (2013.01)

(58) Field of Classification Search
CPC ........ G06F 9/45558; G06F 8/63; G06F 9/547; G06F 2009/45595; G06F 21/10; G06F 21/55; G06F 21/563; G06F 21/572; G06F 21/577; H04L 63/10; H04L 63/14; H04W 12/08; H04W 12/12
See application file for complete search history.

(56) References Cited

U.S. PATENT DOCUMENTS 8,423,954 B2 4/2013 Ronen et al.
8,782,676 B2 7/2014 Dokovski et al.
9,558,216 B2 1/2017 Florendo et al.
10,387,443 B2 8/2019 Tran et al.
10,482,080 B2 11/2019 Auer et al.
10,671,630 B2 6/2020 Tran et al.
10,674,438 B2 6/2020 Bregler et al.
10,747,528 B2 8/2020 Tal
10,783,485 B2 9/2020 Yao et al.
11,030,164 B2 6/2021 Eberlein et al.
11,093,443 B2 8/2021 Bregler et al.
11,144,871 B2 10/2021 Yao et al.
11,188,386 B2 11/2021 Okman
11,275,758 B2 3/2022 Tran et al.
(Continued)

OTHER PUBLICATIONS

U.S. Appl. No. 16/688,941, Auer et al., filed Nov. 19, 2019.
(Continued)

*Primary Examiner* — Sisley N Kim
(74) *Attorney, Agent, or Firm* — Fish & Richardson P.C.

(57) ABSTRACT

A secure side car (SSC) manager reads development artifacts and an application configuration file. Stubs and skeletons are created for inter-process communication between a main application and one or more SSC library containers, the stubs and skeletons based on SSC configurations specified in the application configuration file. Main application code is compiled for the main application. An application container image is created for the main application and a SSC image for each of the one or more SSC library containers. An application container corresponding to the application container image and a SSC library container corresponding to each SSC image or each of the one or more SSC library containers is deployed. A service mesh proxy, which controls network access for libraries within each SSC library container, is configured.

21 Claims, 3 Drawing Sheets

(56) References Cited

U.S. PATENT DOCUMENTS

| | | | |
|---|---|---|---|
| 11,281,767 | B2 | 3/2022 | Suneja et al. |
| 11,386,062 | B2 | 7/2022 | Ofenloch |
| 2013/0263139 | A1 | 10/2013 | Schejter et al. |
| 2019/0205815 | A1 | 7/2019 | Yao et al. |
| 2019/0294779 | A1 | 9/2019 | Suneja et al. |
| 2021/0182251 | A1 | 6/2021 | Eberlein et al. |
| 2021/0365405 | A1 | 11/2021 | Bregler et al. |
| 2021/0400021 | A1 | 12/2021 | Barton et al. |
| 2022/0050723 | A1 | 2/2022 | Okman |
| 2022/0188285 | A1 | 6/2022 | Ofenloch |
| 2022/0300611 | A1* | 9/2022 | Sivaswamy ............. G06F 21/57 |
| 2023/0125847 | A1* | 4/2023 | Sato .................... H04L 63/0281 718/1 |
| 2023/0319044 | A1* | 10/2023 | Warnicke .............. H04L 63/101 726/4 |
| 2023/0385122 | A1* | 11/2023 | Mehrotra ............ G06F 9/45558 |
| 2024/0291866 | A1* | 8/2024 | Kaveri Poompatnam Chandrasekaran ..... H04L 67/10 |

OTHER PUBLICATIONS

Containiq.com [online], "Kubernetes Sidecar Container: Best Practices and Examples" Mar. 13, 2023, retrieved on Mar. 15, 2023, retrieved from URL <https://www.containiq.com/post/kubernetes-sidecar-container>, 8 pages.

Esecurityplanet.com [online], "Top 10 Container Security Solutions" Oct. 20, 2022, retrieved on Mar. 15, 2023, retrieved from URL <https://www.esecurityplanet.com/products/container-and-kubernetes-security-vendors/>, 14 pages.

Jimmysong.io [online], "Understanding How Envoy Sidecar Intercept and Route Traffic in Istio Service Mesh" Dec. 27, 2018, retrieved on Mar. 15, 2023, retrieved from URL <https://jimmysong.io/en/blog/understanding-how-envoy-sidecar-intercept-and-route-traffic-in-istio-service-mesh/>, 6 pages.

Distributed Systems: Concepts and Design, 5th Edition, Pearson (ed), May 2011, 598 pages.

Extended European Search Report in European Appln. No. 23193813.5, mailed on Jan. 29, 2024, 9 pages.

* cited by examiner

SECURE SIDECAR CONTAINER

BACKGROUND

Usually, using 3rd-party libraries with a software application comes with certain risks, as it is not economically viable to sufficiently analyze the libraries and possibly recursively dependent libraries for hidden backdoors, data theft/encryption/corruption procedures, or other malicious code. This is especially true since libraries are updated frequently, and a library which had previously been assessed as "secure" may have been subsequently changed and becomes "problematic" in a newer version. As libraries may actively obfuscate problematic behavior to hide malicious intentions, current approaches of code scanning to identify security vulnerabilities has practical limits, as the approaches can only identify accidental coding mistakes, but not purposeful, directed attacks.

SUMMARY

The present disclosure describes splitting a software application using several libraries at deploy time into several containers, one hosting owned application code and other containers hosting the libraries.

In an implementation, a computer-implemented method, comprises: reading, by a secure side car (SSC) manager, development artifacts and an application configuration file; creating, by the SSC manager, stubs and skeletons for inter-process communication between a main application and one or more SSC library containers, the stubs and skeletons based on SSC configurations specified in the application configuration file; compiling, by the SSC manager, main application code for the main application; creating, by the SSC manager, an application container image for the main application and a SSC image for each of the one or more SSC library containers; deploying, by the SSC manager, an application container corresponding to the application container image and a SSC library container corresponding to each SSC image for each of the one or more SSC library containers; and configuring, by the SSC manager, a service mesh proxy, which controls network access for libraries within each SSC library container.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, in current software deployments, a software application (also, "application" or "app") and used libraries are typically placed in one container and outbound traffic is not managed per destination, that is, owned application code and 3rd-party code is not separated. In the described approach, the owned application code is separated from 3rd-party libraries by using individual containers. This permits specifying container-individual network configurations and blocking calls to the Internet and access to persistence services in the local network by malicious code. Second, security software is typically designed to find programming "bugs", and is not capable of detecting intended and possibly obfuscated backdoors and malicious code. In the described approach, the isolation of libraries in locked containers would include libraries with undetectable security risks. Third, in a manual analysis by a software/system development team (such as, security assessments and tests and threat modeling), if the backdoor is obfuscated, it might not be found by a manual assessment and not be detected during tests as it might not be immediately activated. However, in the described approach, the isolation of libraries in locked containers happens during both test and productive use and prevents later execution of security attacks not detected during test. Fourth, reporting functionality (for example, real-time alerts or periodic log analysis) can be used to determine if malicious activity was attempted by a library (for example, which library, which combination of libraries, and what activity was attempted).

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
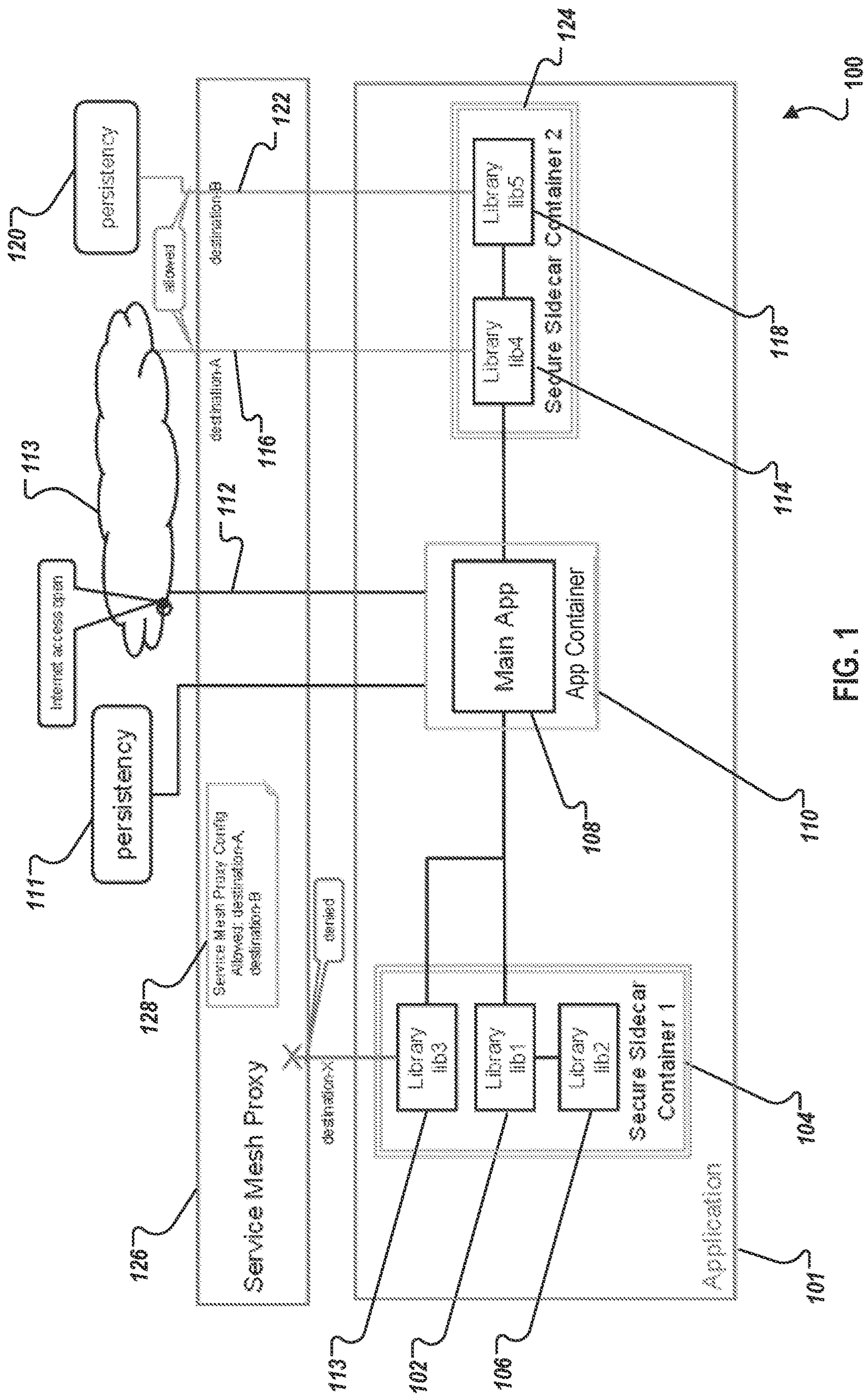
FIG. 1 is a block diagram of an example desired computer-implemented configuration of a software application with one main application and two secure sidecar containers (SSCs), according to an implementation of the present disclosure.

The following detailed description describes splitting a software application (also, "application" or "app") using several libraries at deploy time into several containers, one hosting owned application code and other containers hosting the libraries, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In a micro-services architecture, using a $3^{rd}$-party library (or library) with software applications executing in a container and using a service mesh comes with a certain risk. Typically, applications use a large set of $3^{rd}$-party libraries including open-source software, with the libraries recursively requiring more libraries as a deployment or runtime precondition. Such libraries could be equipped with security violating functionality.

For example, libraries could create data breaches by being configured to connect to a destination on a network (for example, the Internet) and to send data to an attacker (for example, outbound calls for generic data theft). If a library is able to access some or all data of an application, sensitive or confidential data can be exposed unknowingly.

$3^{rd}$-party libraries may also be created in trusted countries and domains, but provide a backdoor for data theft. In these cases, the libraries can be equipped with malicious functionality to steal data, which is offered by trusted sites and distributed through trusted organizations. The library can also provide the ability to make inbound calls for selective data theft.

$3^{rd}$-party libraries consumed directly may include further dependent libraries that contain security critical software. Here, dependent libraries can be added in later versions of a $3^{rd}$-party library or the dependent library is changed without a change in the main library. Therefore, critical changes may go unnoticed. Additionally, not all libraries are provided with open code, which can be analyzed (or read by a developer).

Scanning software applied today tries to identify security bugs, but is not capable of identifying intentional security holes, that were obfuscated by their developers. Intentional security holes can be hidden in a way that they are very hard to detect even by skilled developers and regular security scanning software is completely unable to detect such malicious attacks.

$3^{rd}$-party libraries can encrypt a persistency and ask for money or data to receive a key to de-crypt, even without direct Internet access (for example, ransomware). If a library has access to data/persistency, it could encrypt the data with an unknown key and disable an ability of a data owner to continue to use the data. Potentially, encryption can happen and be undiscovered for a certain period of time, which can even disable the use of backups to restore useful readable data. Network scanning software might not detect such behavior, as no external Internet communication may be necessary to execute such an attack.

From a security standpoint, analyzing a complete set of libraries for an application in any kind of use can be very time consuming, especially, since such an analysis must be repeated for each new version of the libraries. A library which had previously been assessed as "secure" may have been subsequently changed and becomes "problematic" in a newer version.

It is not practical from a time or economic standpoint to sufficiently analyze (manually or automatically) used libraries and recursively dependent libraries for potential security threats. Another approach is needed to reduce the risk of consuming open source and other $3^{rd}$-party libraries.

At a high-level, an approach is described to deploy and run an application using $3^{rd}$-party libraries with a separate secure sidecar container (SSC) hosting the libraries. This configuration is highly secure as it prevents malicious libraries from accessing the Internet in an uncontrolled fashion. In this way, open source and other $3^{rd}$-party libraries can be used with less concerns about security, preventing data breach or ransomware attacks via the libraries by putting them in "sandbox"-type environment within a service mesh setup.

In the described approach, an application using several libraries is split at deployment time into several containers, one hosting the owned main application code and other containers hosting the libraries. The containers hosting the libraries form SSCs and, by default, do not allow outbound network traffic. Inbound network traffic is also restricted to communication from within the localhost, which blocks all network requests (for example, from the Internet).

The libraries in a SSC are run in an owned process and are called by the main application code using inter-process communication (that is, local loop back, shared memory, etc.). For this to happen transparently, stubs and skeletons are generated and linked to the main application to permit remote communication between containers without additional development effort.

Stubs provide local application programming interfaces (APIs) for remote functionality. In an implementation, stubs marshal API parameters and send them using a remote protocol to a destination where actual functionality is implemented. On the remote side, the calls are accepted by skeletons that unmarshal the API parameters sent using the remote protocol and perform local API calls to actual implemented functionality. If the API provides return parameters, the skeletons marshal them, send them back using the remote protocol to the stub that unmarshals them, and returns them locally. The effect of this approach is that neither a caller nor a callee are aware of the remote communication over a network as they only perform/receive local API calls. This permits transparently separating code that was originally developed for local embedding into different containers.

In some implementations, a SSC can be configured to allow outbound communication to a well-specified destination based on an allow-type list (for example, a white list). A service mesh proxy of the application can also be configured similarly to allow communication to a well-specified destination. By default, all other communication can be blocked.

When writing an application and starting to use a library, a configuration for the library to reside in an SSC is created. Optionally, required destinations are identified and added to the application configuration.

During build time, the application can then be deployed to a set of containers, one for the main application and one-to-many for the SSCs. During build time, specified libraries can pull in additionally required libraries. These are added to the SSC the original library is configured to reside in. A library and its required libraries are therefore within one SSC.

In some implementations, different SSCs can be used. For example, libraries which require external destinations should be separated from libraries which do not require destinations. On the other hand, multiple libraries can also be combined into a single SSC to reduce overhead (for example, if none of the libraries require network access and therefore there is no exceptional destination configured for one library that could be also accessed by a different library).

Following the SSC configuration(s), the service mesh proxy is configured. The service mesh proxy is configured to indicate which destinations are allowed for each SSC.

When the application is used in this setup (that is, with the SSCs and a configured service mesh proxy), every unintended outbound call by libraries is prevented. Therefore, no data can be sent unknowingly/maliciously. If a library needs persistency access, the persistency destination is configured to permit the access, and the library will likely be residing in its own SSC. Since no other library in another SSC can access the persistency of the main application or other SSCs, data corruption or encryption for ransomware attacks is preventable.

FIG. 1 is a block diagram of an example desired computer-implemented configuration 100 of a software application with one main application and two SSCs, according to an implementation of the present disclosure. For the purposes of the example, one SSC is configured with allowed access to two destinations and one SSC is configured with prevented access to any (unwanted) destination.

During development of application 101 (also refer to FIG. 2, 214 and 1*a*), a developer (not illustrated), decides to use a $3^{rd}$-party library 1 (lib1) 102, that should be network isolated (for example, to prevent possible backdoor use). The developer specifies a first sandbox SSC (SSC1) 104, that will contain lib1 102, and which will not allow outgoing/incoming network calls. Other libraries (for example, library 2 (lib2) 106) that are required by lib1 102 are added to SSC1 104 (for example, using a PYTHON Preferred Installer Program (PIP) or a JAVASCRIPT Node Package Manager (NPM) install).

The main application (main app) 108 is placed within a separate application container 110. To call lib1 102 from the main app 108, local stubs (not illustrated) to be called by the main app 108 and skeletons (not illustrated)) locally calling lib1 102 are generated. The local stubs and skeletons perform inter-process communication between containers (for example, using local loop back or shared memory). Note that main app 108 is permitted access to a persistency 111 and Internet access 112 (for example, using network 113).

The developer also decides to use a third $3^{rd}$-party library (lib3) 113, and adds lib3 113 to the SSC1 104.

The fourth $3^{rd}$-party library (lib4) 114 that the developer wants to add to the application 101 requires Internet access to one destination A (Internet address) 116 (for example, using network 113). Lib4 114 requires a dependent fifth $3^{rd}$-party library (lib5) 118, which requires access to a persistency service 120 at a destination B 122. To separate lib4 114 and lib5 118 from the fully isolated libraries lib1 102, lib2, 106, and lib3 113, the developer specifies a second SSC (SSC2) 124, that will contain lib4 114 and lib5 118.

The developer adds destination A 116 and destination B 122 to an allow-list (not illustrated) of SSC2 124. In some implementations, the allow-list is a configuration file used during deployment for configuring the service mesh proxy 126, which is added to an application code repository (not illustrated) and bundled for deployment. For example, a service mesh proxy configuration for secure sidecars 128 is illustrated, which indicates that destination A 116 and destination B 122 is allowed. Similarly, main app 108 is configured with the service mesh proxy 128 to access persistency 111 and the Internet 112. In some implementations, the main app 108 by default has no restrictions, whereas all SSCs are by default secure (that is, if nothing is configured, SSCs cannot perform any external communication). It is possible to restrict access of the main app 108, but main app 108 has a different default (that is, access is permitted) in case no configuration is provided to prevent it. In some implementations, a single configuration file can contain multiple configurations for SSCs and the main app 108. In some implementations, configurations can we separated into two or more separate configuration files per container.

In some implementations, required code artifacts for the described approach include the main app code (for example, code for main app 108), a list of required libraries (for example, lib1 102 and lib4 114), and a configuration file for SSCs (for example, service mesh proxy configuration for secure sidecars 128) that contains a list of libraries and destinations they are permitted to call. In some implementations, service mesh proxy configuration 128 is an excerpt of a portion of an application configuration file (for example, app-config 208 in FIG. 2) and containing only a proxy configuration for the service mesh proxy 126.

Following configuration of the application 101 the developer triggers a continuous integration and continuous deployment (CI/CD) pipeline. A CI/CD pipeline is a necessary series of steps performed to deliver a new version of software.

Figure 2:
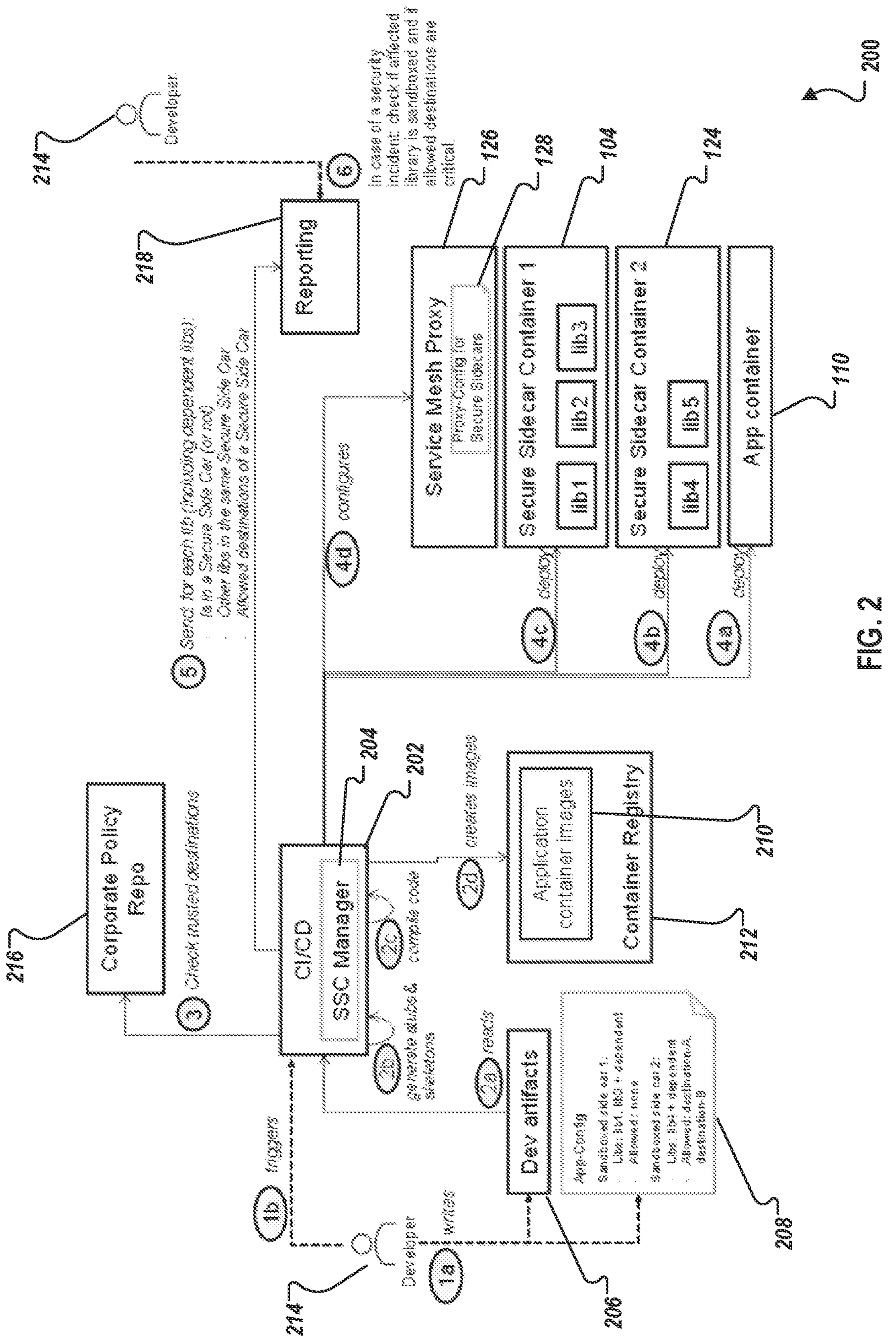
FIG. 2 is a box diagram illustrating an example computer-implemented method and associated computer-implemented system components for creating a software application with configured SSCs, according to an implementation of the present disclosure.

FIG. 2 is a box diagram illustrating an example computer-implemented method 200 and associated computer-implemented system components for creating a software application with configured SSCs, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

With respect to the illustrated computer implemented system, the described CI/CD pipeline 202 has several new steps introduced (collectively, SSC manager 204). For example, the SSC manager 204 reads development artifacts (dev artifacts) 206 (which contain coding of an application, configuration, and which libraries to use) and the new application configuration (app-config) 208 (which, for example, contains configuration for SSCs, what is in SSCs, and what to open for an SSC; creates stubs and skeletons based on sidecar configuration(s) specified in the app-config 208 (that is, which libraries are configured to run in a SSC and the allowed destinations); compiles code; creates a secure sidecar container image as part of application container images 210 within a container registry 212 based on configuration data specified by a developer 214; queries a corporate policy repository (corporate policy repo) 216, if destinations to be opened as specified by the developer 214 are trusted according to corporate guidelines; deploys an application container (app container) 110 including its associated SSCs (for example, SSC1 104 and SSC2 124); configures the service mesh proxy 126 (for example, service mesh proxy configuration for secure sidecars 128) generated from configuration data (for example, the app-config 208) specified by the developer 214, which blocks network access for SSCs (with the exception of destinations configured to be allowed); and optionally sends data to reporting 218 on content of SSCs and allowed destinations configured in the service mesh proxy 126.

The corporate policy repo 216: 1) contains a list of trusted destinations; 2) can be queried for trusted destinations; and 3) can be triggered to run an assessment process for a new destination.

The service mesh proxy 126 is configured to enable container specific network filtering. The configuration goes beyond currently available service mesh proxy 126 configuration functionality that allows network traffic filtering only on an application level. In some implementations, the enablement of container-specific network filtering is implemented by separating different containers of an application (for example, application 101 of FIG. 1) based on assigned network ports. Therefore, SSCs (for example, SSC1 104 and SSC2 124) can be handled differently than a main app (for example, main app 108 of FIG. 1) of the application. When the container specific network configuration from the app-config 208 is applied, it defines standard behavior for the App container 110 and permits certain destinations (and blocking all other access) for the SSCs.

Reporting 218 is a reporting infrastructure storing information on developed applications, the 3$^{rd}$-party libraries used (and which further libraries are recursively used), assignment of applications and libraries to containers, and allow lists of destinations for SSCs.

As previously mentioned, the SSCs have a default configuration of no outbound communication allowed and no inbound communication from outside the SSC. Communication is only permitted with the app container 110. Destination access by libraries in the SSCs can be explicitly allowed (by configuration in the app-config 208) for outbound access. In some implementations, inbound access to an SSC could be permitted. For example, a data push channel or an event notification channel could be configured to permit inbound access from a defined destination.

With respect to method 200:

At 1*a*, steps consistent with development of an application are performed (for example, consistent with the previous description of FIG. 1). After 1*a*, method 200 proceeds to 1*b*.

At 1*b*, the developer 214 triggers the previously described CI/CD pipeline 202. From 1*b*, method 200 proceeds to 2*a*.

Starting at 2*a*, the application (for example, application 101 of FIG. 1) is built. The CI/CD pipeline 202 (comprising the SSC manager 204) executes.

At 2*a*, the app-config 208 is scanned, setup for libraries in SSCs is read, and desired destinations intended be added to the allow list (that is, as a trusted destination) are read. From 2*a*, method 200 proceeds to 2*b*.

At 2*b*, stubs and skeletons are generated for inter-process communication between the main app (for example, main app 108 of FIG. 1 in app container 110) and library containers (for example, SSC1 104 and SSC2 124). From 2*b*, method 200 proceeds to 2*c*.

At 2*c*, the application code is compiled. Stubs are added for transparent remote calls to any containerized libraries. In the illustrated example, an image for SSC1 104 receives lib1, lib 2, and lib3 (for example, lib1 102, lib2 106, and lib3 113 of FIG. 1) and skeletons to receive remote calls from the app container 110 and transparently invoke the libraries. The image for SSC2 124 receives lib4 and lib5 (for example, lib4 114 and lib5 118 of FIG. 1) and skeletons to receive remote calls from the app container 110 and transparently invoke the libraries. From 2*c*, method 200 proceeds to 2*d*.

At 2*d*, container images 210 are created from the artifacts built in the previous step and stored in container registry 212. Here, a first container image for the app container 110 receives the main app code/compiled dev artifacts 206. After 2*d*, the application image has been built and method 200 proceeds to 3.

At 3, desired destinations to allow access to are checked against the corporate policy repo 216 of previously added "trusted destinations." In some implementations, only trusted destinations can be configured in an allowed list of a SSC configuration. In the case that a new destination is desired, the destination needs to first pass a corporate process to add the new destination to the trusted destinations list in the corporate policy repo216. Then, in a second step, the new destination can be added to the app-config 208. If a non-trusted desired destination is attempted to be added, step 3 will fail. From 3, method 200 proceeds to 4*a*.

Starting at 4*a*, container images are deployed and configured.

At 4*a*, the app container 110 is deployed. From 4*a*, method 200 proceeds to 4*b*.

At 4*b*, SSC1 104 is deployed. From 4*b*, method 200 proceeds to 4*c*.

At 4*c*, SSC2 124 is deployed. From 4*c*, method 200 proceeds to 4*d*.

At 4*d*, the service mesh proxy config for secure sidecars 128 is generated from an allow list in the app-config 208 for the SSCs and deployed to the service mesh proxy 126. As an example, following 4*d* and consistent with the description of FIG. 1, destination A and destination B can be reached from SSC2 124. After 4*d* container images are considered deployed and configured. From 4*d*, method 200 proceeds to 5.

At 5, reporting is provided with data using reporting 218. In some implementations, for each application, data is sent describing: 1) 3$^{rd}$-party libraries used, directly or indirectly; 2) if one or more SSCs are configured for use by the application; 3) the libraries residing in the same SSC, and 4) allowed destinations per SSC. Some implementations can include more or less data, including data not described but consistent with the described approach as would be understood by one of ordinary skill in the art.

In some implementations, a deployed application can be tested. For example, an error might be found if a library call a destination and is blocked. This situation may require an active step to open a connection and a developer can decide if the destination is to be added to the list of allowed destinations, in a subsequent step 3, the destination is checked if it is trusted or not with the "Corporate Policy Repo" 216. It is important to note that call by libraries to unknown destinations are not necessarily executed in testing, but if access to non-configured destinations are blocked, no harm can be done even in production.

When the application is deployed for a production environment, applicable containers are deployed and the configuration for the service mesh proxy is applied. After 5, method 200 proceeds to 6.

At 6, in a case of a security incident in some library that became public, a developer can query the reporting system. In some implementations, queries can include: 1) is the affected library used by any application?; 2) is the library exclusively used in secure sidecars?; 3) is an allow-list maintained for these sidecars?; and 4) for which destinations? Some implementations can include other questions consistent with the described approach as would be understood by one of ordinary skill in the art.

If a library/destination is identified (for example, by a security team of a software vendor or a 3rd party using the library and identifying a problem) as critical, the developer can identify the critical libraries, identify which applications need to be modified to remove the critical library, and identify if some applications must be shut down in the meantime in case a secure sidecar container was not applied for the affected library.

With a configuration change to isolate an affected library in an SSC, further unwanted communication can be prevented. With less time pressure, as an application is continuing to run in a secure fashion, a developer can analyze and determine how to remove the affected library or to replace the affected library with a secure library offering.

Figure 3:
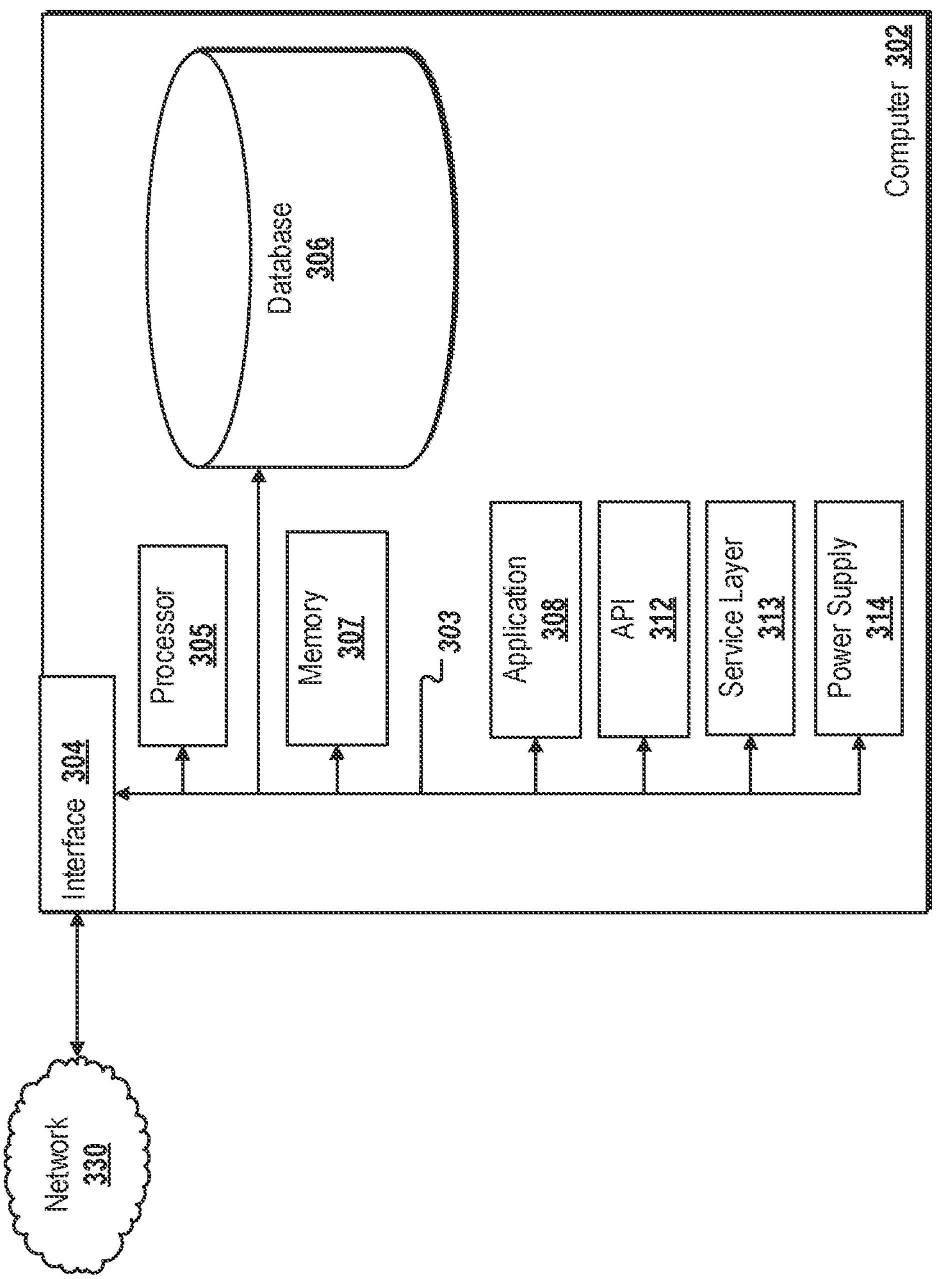
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 302 can include an input device, such as a keypad, keyboard, or touch screen, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as, for example, a client, network component, a server, or a database or another persistency, or a combination of roles for performing the subject matter described in the present disclosure. The illustrated Computer 302 is communicably coupled with a Network 330. In some implementations, one or more components of the Computer 302 can be configured to operate within an environment, or a combination of environments, including cloud-computing, local, or global.

At a high level, the Computer 302 is an electronic computing device operable to receive, transmit, process, store, or manage data and information associated with the described subject matter. According to some implementations, the Computer 302 can also include or be communicably coupled with a server, such as an application server, e-mail server, web server, caching server, or streaming data server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory or conventional database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302. The Database 306 can hold and operate on at least any data type mentioned or any data type consistent with this disclosure.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term “client,” “user,” or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: reading, by a secure side car (SSC) manager, development artifacts and an application configuration file; creating, by the SSC manager, stubs and skeletons for inter-process communication between a main application and one or more SSC library containers, the stubs and skeletons based on SSC configurations specified in the application configuration file; compiling, by the SSC manager, main application code for the main application; creating, by the SSC manager, an application container image for the main application and a SSC image for each of the one or more SSC library containers; deploying, by the SSC manager, an application container corresponding to the application container image and a SSC library container corresponding to each SSC image for each of the one or more SSC library containers; and configuring, by the SSC manager, a service mesh proxy, which controls network access for libraries within each SSC library container.

The foregoing and other described implementations can each, optionally, include one or more of the following features:

A first feature, combinable with any of the following features, wherein the development artifacts include one or more of application coding for the main application, configuration, and which libraries the main application can use, and wherein the application configuration file contains one or more of a configuration for the one or more SSC library containers, which libraries are configured to run in the one or more SSC library containers, and allowed destinations for the one or more SSC library containers.

A second feature, combinable with any of the previous or following features, wherein the compiling, by the SSC manager, main application code for the main application comprises adding stubs for transparent remote calls to containerized libraries.

A third feature, combinable with any of the previous or following features, wherein the application container image for the main application and the SSC image for each of the one or more SSC library containers is stored in a container registry.

A fourth feature, combinable with any of the previous or following features, comprising checking desired locations to permit containerized libraries to access against a corporate policy repository of trusted destinations.

A fifth feature, combinable with any of the previous or following features, wherein default network access for a SSC library container is no outbound communication allowed, no inbound communication from outside the SSC library container, and communication only with the application container.

A sixth feature, combinable with any of the previous or following features, comprising providing reporting functionality with respect to each SSC library container and associated libraries.

In a second implementation, a non-transitory, computer-readable medium storing one or more instructions executable by a computer system to perform operations, comprising: reading, by a secure side car (SSC) manager, development artifacts and an application configuration file; creating, by the SSC manager, stubs and skeletons for inter-process communication between a main application and one or more SSC library containers, the stubs and skeletons based on SSC configurations specified in the application configuration file; compiling, by the SSC manager, main application code for the main application; creating, by the SSC manager, an application container image for the main application and a SSC image for each of the one or more SSC library containers; deploying, by the SSC manager, an application container corresponding to the application container image and a SSC library container corresponding to each SSC image for each of the one or more SSC library containers; and configuring, by the SSC manager, a service mesh proxy, which controls network access for libraries within each SSC library container.

The foregoing and other described implementations can each, optionally, include one or more of the following features:

A first feature, combinable with any of the following features, wherein the development artifacts include one or more of application coding for the main application, configuration, and which libraries the main application can use, and wherein the application configuration file contains one or more of a configuration for the one or more SSC library containers, which libraries are configured to run in the one or more SSC library containers, and allowed destinations for the one or more SSC library containers.

A second feature, combinable with any of the previous or following features, wherein the compiling, by the SSC manager, main application code for the main application comprises adding stubs for transparent remote calls to containerized libraries.

A third feature, combinable with any of the previous or following features, wherein the application container image for the main application and the SSC image for each of the one or more SSC library containers is stored in a container registry.

A fourth feature, combinable with any of the previous or following features, comprising checking desired locations to permit containerized libraries to access against a corporate policy repository of trusted destinations.

A fifth feature, combinable with any of the previous or following features, wherein default network access for a SSC library container is no outbound communication allowed, no inbound communication from outside the SSC library container, and communication only with the application container.

A sixth feature, combinable with any of the previous or following features, comprising providing reporting functionality with respect to each SSC library container and associated libraries.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: reading, by a secure side car (SSC) manager, development artifacts and an application configuration file; creating, by the SSC manager, stubs and skeletons for inter-process communication between a main application and one or more SSC library containers, the stubs and skeletons based on SSC configurations specified in the application configuration file; compiling, by the SSC manager, main application code for the main application; creating, by the SSC manager, an application container image for the main application and a SSC image for each of the one or more SSC library containers; deploying, by the SSC manager, an application container corresponding to the application container image and a SSC library container corresponding to each SSC image for each of the one or more SSC library containers; and configuring, by the SSC manager, a service mesh proxy, which controls network access for libraries within each SSC library container.

The foregoing and other described implementations can each, optionally, include one or more of the following features:

A first feature, combinable with any of the following features, wherein the development artifacts include one or more of application coding for the main application, configuration, and which libraries the main application can use, and wherein the application configuration file contains one or more of a configuration for the one or more SSC library containers, which libraries are configured to run in the one or more SSC library containers, and allowed destinations for the one or more SSC library containers.

A second feature, combinable with any of the previous or following features, wherein the compiling, by the SSC manager, main application code for the main application comprises adding stubs for transparent remote calls to containerized libraries.

A third feature, combinable with any of the previous or following features, wherein the application container image for the main application and the SSC image for each of the one or more SSC library containers is stored in a container registry.

A fourth feature, combinable with any of the previous or following features, comprising checking desired locations to permit containerized libraries to access against a corporate policy repository of trusted destinations.

A fifth feature, combinable with any of the previous or following features, wherein default network access for a SSC library container is no outbound communication allowed, no inbound communication from outside the SSC library container, and communication only with the application container.

A sixth feature, combinable with any of the previous or following features, comprising providing reporting functionality with respect to each SSC library container and associated libraries.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R. DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:

reading, by a secure side car (SSC) manager, development artifacts and an application configuration file;

creating, by the SSC manager, stubs and skeletons for inter-process communication between a main application and one or more SSC library containers, the stubs and skeletons based on SSC configurations specified in the application configuration file, wherein the stubs provide local application programming interfaces (APIs) for remote functionality implemented by libraries in the one or more SSC library containers, and wherein the stubs are configured to marshal API parameters and send the API parameters to the skeletons in the one or more SSC library containers;

compiling, by the SSC manager, main application code for the main application, wherein compiling comprises linking the created stubs to the main application code;

creating, by the SSC manager, an application container image for the main application and a SSC image for each of the one or more SSC library containers;

deploying, by the SSC manager, an application container corresponding to the application container image and a SSC library container corresponding to each SSC image for each of the one or more SSC library containers; and configuring, by the SSC manager, a service mesh proxy, which controls network access for libraries within each SSC library container and is configured to enable container specific network filtering.

2. The computer-implemented method of claim 1, wherein the development artifacts include one or more of application coding for the main application, configuration, and which libraries the main application can use, and wherein the application configuration file contains one or more of a configuration for the one or more SSC library containers, which libraries are configured to run in the one or more SSC library containers, and allowed destinations for the one or more SSC library containers.

3. The computer-implemented method of claim 1, wherein the compiling, by the SSC manager, main application code for the main application comprises adding stubs for transparent remote calls to containerized libraries.

4. The computer-implemented method of claim 1, wherein the application container image for the main application and the SSC image for each of the one or more SSC library containers is stored in a container registry.

5. The computer-implemented method of claim 1, comprising checking desired locations to permit containerized libraries to access against a corporate policy repository of trusted destinations.

6. The computer-implemented method of claim 1, wherein default network access for a SSC library container is no outbound communication allowed, no inbound communication from outside the SSC library container, and communication only with the application container.

7. The computer-implemented method of claim 1, comprising providing reporting functionality with respect to each SSC library container and associated libraries.

8. A non-transitory, computer-readable medium storing one or more instructions executable by a computer system to perform operations, comprising:

- reading, by a secure side car (SSC) manager, development artifacts and an application configuration file;
- creating, by the SSC manager, stubs and skeletons for inter-process communication between a main application and one or more SSC library containers, the stubs and skeletons based on SSC configurations specified in the application configuration file, wherein the stubs provide local application programming interfaces (APIs) for remote functionality implemented by libraries in the one or more SSC library containers, and wherein the stubs are configured to marshal API parameters and send the API parameters to the skeletons in the one or more SSC library containers;
- compiling, by the SSC manager, main application code for the main application, wherein compiling comprises linking the created stubs to the main application code;
- creating, by the SSC manager, an application container image for the main application and a SSC image for each of the one or more SSC library containers;
- deploying, by the SSC manager, an application container corresponding to the application container image and a SSC library container corresponding to each SSC image for each of the one or more SSC library containers; and
- configuring, by the SSC manager, a service mesh proxy, which controls network access for libraries within each SSC library container and is configured to enable container specific network filtering.

9. The non-transitory, computer-readable medium of claim 8, wherein the development artifacts include one or more of application coding for the main application, configuration, and which libraries the main application can use, and wherein the application configuration file contains one or more of a configuration for the one or more SSC library containers, which libraries are configured to run in the one or more SSC library containers, and allowed destinations for the one or more SSC library containers.

10. The non-transitory, computer-readable medium of claim 8, wherein the compiling, by the SSC manager, main application code for the main application comprises adding stubs for transparent remote calls to containerized libraries.

11. The non-transitory, computer-readable medium of claim 8, wherein the application container image for the main application and the SSC image for each of the one or more SSC library containers is stored in a container registry.

12. The non-transitory, computer-readable medium of claim 8, comprising checking desired locations to permit containerized libraries to access against a corporate policy repository of trusted destinations.

13. The non-transitory, computer-readable medium of claim 8, wherein default network access for a SSC library container is no outbound communication allowed, no inbound communication from outside the SSC library container, and communication only with the application container.

14. The non-transitory, computer-readable medium of claim 8, comprising providing reporting functionality with respect to each SSC library container and associated libraries.

15. A computer-implemented system, comprising:

- one or more computers; and
- one or more computer memory devices interoperably coupled with the one or more computers and having tangible, non-transitory, machine-readable media storing one or more instructions that, when executed by the one or more computers, perform one or more operations, comprising:
  - reading, by a secure side car (SSC) manager, development artifacts and an application configuration file;
  - creating, by the SSC manager, stubs and skeletons for inter-process communication between a main application and one or more SSC library containers, the stubs and skeletons based on SSC configurations specified in the application configuration file, wherein the stubs provide local application programming interfaces (APIs) for remote functionality implemented by libraries in the one or more SSC library containers, and wherein the stubs are configured to marshal API parameters and send the API parameters to the skeletons in the one or more SSC library containers;
  - compiling, by the SSC manager, main application code for the main application, wherein compiling comprises linking the created stubs to the main application code;
  - creating, by the SSC manager, an application container image for the main application and a SSC image for each of the one or more SSC library containers;
  - deploying, by the SSC manager, an application container corresponding to the application container image and a SSC library container corresponding to each SSC image for each of the one or more SSC library containers; and
  - configuring, by the SSC manager, a service mesh proxy, which controls network access for libraries within each SSC library container and is configured to enable container specific network filtering.

16. The computer-implemented system of claim 15, wherein the development artifacts include one or more of application coding for the main application, configuration, and which libraries the main application can use, and wherein the application configuration file contains one or more of a configuration for the one or more SSC library containers, which libraries are configured to run in the one or more SSC library containers, and allowed destinations for the one or more SSC library containers.

17. The computer-implemented system of claim 15, wherein the compiling, by the SSC manager, main application code for the main application comprises adding stubs for transparent remote calls to containerized libraries.

18. The computer-implemented system of claim 15, wherein the application container image for the main application and the SSC image for each of the one or more SSC library containers is stored in a container registry.

19. The computer-implemented system of claim 15, comprising checking desired locations to permit containerized libraries to access against a corporate policy repository of trusted destinations.

20. The computer-implemented system of claim 15, wherein default network access for a SSC library container is no outbound communication allowed, no inbound communication from outside the SSC library container, and communication only with the application container.

21. The computer-implemented system of claim 15, comprising providing reporting functionality with respect to each SSC library container and associated libraries.

* * * * *